Oct. 29, 1929.  T. H. TISDALL  1,733,762
TROLLEY WHEEL
Filed Jan. 31, 1928
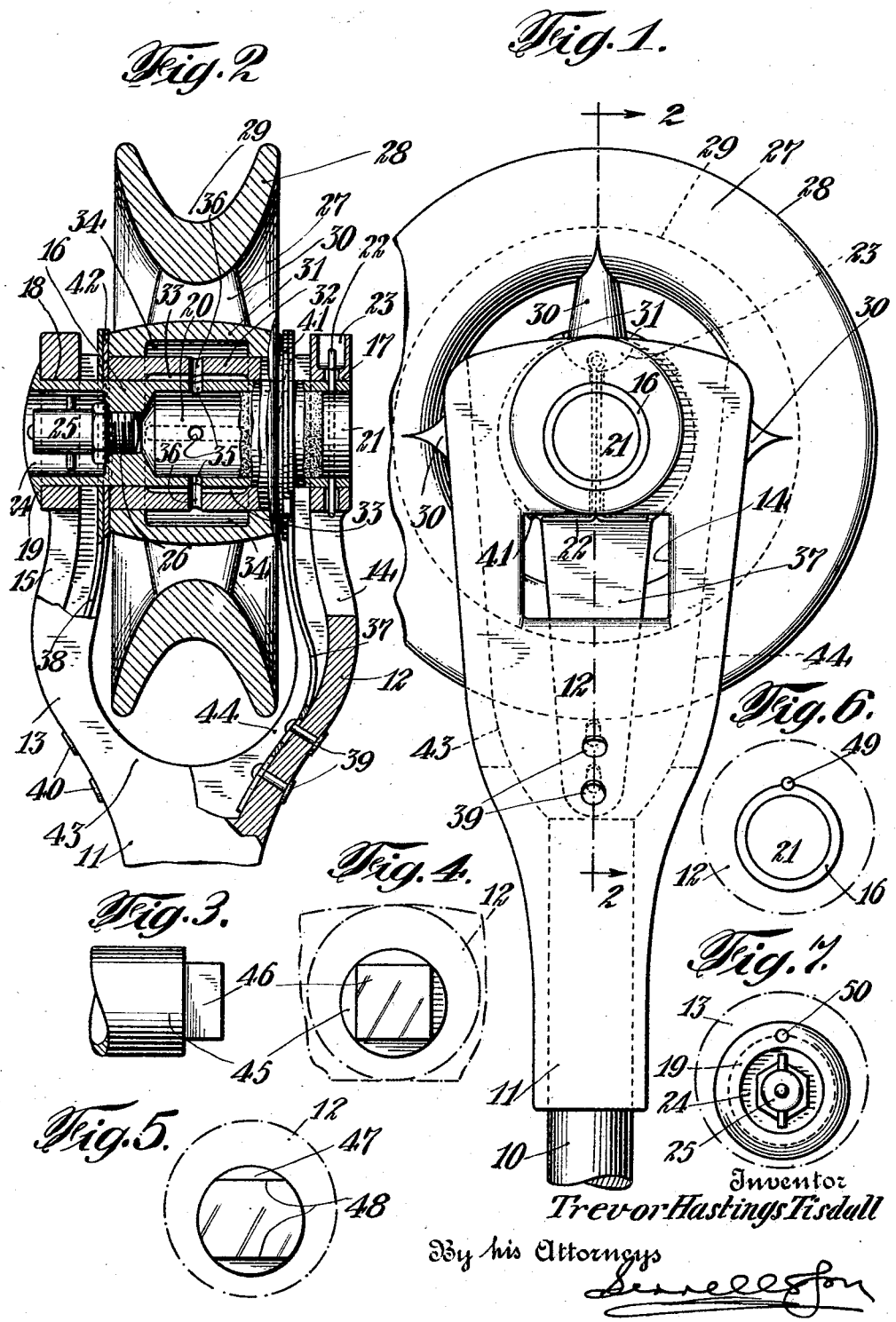
Inventor
Trevor Hastings Tisdall
By his Attorneys

Patented Oct. 29, 1929

1,733,762

UNITED STATES PATENT OFFICE

TREVOR H. TISDALL, OF BROOKLYN, NEW YORK, ASSIGNOR TO COLUMBIA MACHINE WORKS AND MALLEABLE IRON CO., OF NEW YORK, N. Y., A CORPORATION OF NEW YORK

TROLLEY WHEEL

Application filed January 31, 1928. Serial No. 250,834.

This invention relates to a trolley wheel and more particularly to a simple structure by which a trolley wheel is mounted in the usual harp at the outer end of a trolley pole in such a manner as to provide for adequately lubricating the bearing upon which the trolley wheel turns and at the same time permitting a predetermined amount of lateral play of the trolley wheel relatively to the harp without detriment to the electrical contact between the trolley wheel and the pole. To this end, in carrying out the invention, the harp is provided with a fixed axle which also functions as a reservoir for a lubricant and upon which the trolley wheel is journaled and the bearing adequately lubricated, as hereinafter more particularly described.

In the drawing Figure 1 is a side elevation of the trolley wheel mounted in accordance with this invention, Figure 2 is a section on line 2—2, Figure 1, Figure 3 is a partial elevation illustrating one end of a modified form of axle, Figure 4 is an end view of the same, Figure 5 is a view similar to Figure 4 showing another modification, Figure 6 is a partial end elevation illustrating an additional manner of securing one end of the axle in place in the harp, and Figure 7 is a similar view of the other end of the axle.

In the drawing 10 indicates a trolley pole, a portion of which is illustrated and which, as will be understood, is of the usual construction. Also, as illustrated, at the outer or upper end of the pole 10 the same is fitted with a harp member 11. This harp member 11 terminates in spaced arms 12 and 13 in which, as illustrated, there may be oppositely disposed apertures 14 and 15. Mounted in a fixed position in the spaced arms 12 and 13 and extending between the same adjacent the outer ends thereof there is employed an axle or pin 16. This pin is adapted to be received in sockets or openings 17 and 18 provided therefor in the arms 12 and 13. At one end the axle 16 is provided with a head 19 adapted to bear against the outer surface of the adjacent face on the arm 13 so as to determine in one direction the position of the axle. This axle 16 is interiorly recessed to provide a chamber 20 for grease, oil or any other suitable lubricant. At the end of the axle opposite the head the same is open and fitted with a plug 21, as clearly illustrated in Figures 1 and 2 of the drawing. This plug is secured in place and the axle is fixed in position by means of a cotter pin 22 which, as shown in the construction illustrated in Figures 1 and 2, passes through openings provided for this purpose in the arm 12, in the axle 16, and in the plug 21, with the head of the cotter pin lying in a recess 23 in the outer extermity of the arm, and the ends of the cotter pin turned to a position in which they bear against the surface defining the upper or outer face of the recess 14. By this structure, as will be readily understood, the axle is fixed in position relatively to the arms of the harp. The head end of the axle is recessed, as indicated at 24, so as to receive a grease cup 25 which may be turned down to position in a tapped opening 26 whereby a communication is made between the grease cup and the lubricant reservoir for the supply of grease or other lubricant from the cup to this reservoir.

The trolley wheel is journaled on the axle 16 so as to turn thereon between the spaced arms 12 and 13. This trolley wheel, indicated at 27, is preferably constructed so as to include a rim 28 having a peripheral groove 29 and spokes 30 connecting the rim with a hub 31. Suitably secured in the hub 31 there is a bushing 32. This bushing may be shrunk to position in the hub or otherwise secured thereto in any desired manner. In the bushing there is a series of internal preferably longitudinally disposed recesses 33 and in the hub 31 there is a circular recess 34. Preferably in radially disposed positions there are ports 35 in the wall of the axle and similarly placed ports 36 in the wall of the bushing whereby communication is provided between the lubricant reservoir in the axle and the recesses 33 in the bushing and also the circular recess 34 in the hub. It will be understood, of course, that the bearing upon which the wheel revolves is between the bushing and the axle so that the lubricant may pass from the main reservoir in the axle to the recesses in the bushing to adequately lubricate the moving parts and also that it is possible for the lubricant in the circular recess in the hub to pass by way of the ports 36 to the recesses in the bushing whereby this circular recess in the hub functions in the nature of a reserve reservoir for the lubricant.

In order to maintain the trolley wheel in a centrally disposed position between the arms of the harp I may employ springs 37 and 38 secured at their corresponding inner ends by rivets 39 and 40 or otherwise to the inner surfaces of the arms 12 and 13, whereas, the outer ends of these springs span the axle 16 and with intervening washers 41 and 42 bear against the outer faces of the bushing and the hub. Also, as indicated, the harp may be provided with ribs 43 and 44, as indicated in Figures 1 and 2 of the drawing. These ribs, however, form no material part of the invention.

In carrying out the invention the axle upon which the trolley wheel revolves may be fixed in position in the arms of the harp in many obvious ways without departing from the nature and spirit of the invention.

As illustrated, for example, in Figures 3 and 4 the end of the axle opposite the head instead of being open and fitted with a plug, as illustrated in Figures 1 and 2, may be closed. This end of the axle in these figures, as indicated at 45, is provided with a square head 46 so that the axle may be turned to and secured in position in the arms of the harp. In like manner, as illustrated in Figure 5, the end 47 of the axle may be closed and provided with a head having oppositely disposed flattened sides, as indicated at 48. These and other forms of axles may be secured in the arms in obvious ways, for example, as shown in Figure 6 the outer surface of the axle may be provided with a half-round recess and the inner surface of the socket in the arm provided with a similarly shaped recess so that when these recesses are brought into registration a pin 49 may be inserted therein to prevent the axle from turning relatively to the arm. Similarly at the head of the axle the same and the adjacent portion of the arm of the harp may be provided with a hole and the recess respectively to receive a pin 50 as indicated in Figure 7 to also prevent a revoluble movement between the axle and the arm.

From the foregoing it will be understood that the trolley wheel structure as hereinbefore described is one in which ample provision is made for lubricating the bearing upon which the wheel revolves without interfering with the electrical transmission between the wheel and the harp and pole.

I claim as my invention:

1. In a trolley wheel structure, a harp having spaced arms with oppositely disposed bearings therein, an axle having a recess at one end thereof and a flange for contacting with one of the arms of the harp when the axles is in position in the bearings in said arms, the axle having a lubricant chamber which is open at the opposite end of the axle, a plug for normally closing the said open end of the axle, a pin passing through the plug, the walls of the axle and the bearing in the other of the said arms of the harp to fix the axle in position both revolubly and longitudinally and to simultaneously secure the said plug in position therein, a trolley wheel, a bushing fixed in the hub of the trolley wheel, there being radially disposed ports passing through the wall of the axle and through the bushing to a circumferentially disposed recess in the said hub, and a device lying in the recess at the flanged end of the axle and communicating with the lubricant chamber therein for admitting a lubricant to the said chamber.

2. In a trolley wheel structure, spaced arms having oppositely disposed bearings therein, an axle having a recess at one end thereof and a flange for contacting with one of the said arms when the axle is in position in the bearings in the arms, the said axle having a lubricant chamber which is open at the opposite end thereof, a plug for normally closing the said open end of the axle, a pin passing through the plug, the walls of the axle and the bearing in the other of the said arms to fix the axle in position both revolubly and longitudinally and to simultaneously secure the plug in position therein, a trolley wheel mounted on the said axle, there being ports making communication between the said lubricant chamber and the bearing surfaces between the said axle and the hub of the trolley wheel, and means lying within the recess in the axle for admitting a lubricant to the said lubricant chamber.

3. In a trolley wheel structure, spaced arms having oppositely disposed bearings therein, an axle having a recess at one end thereof and a flange for contacting with one of the said arms when the axle is in position in the bearings in the arms, the said axle having a lubricant chamber which is open at the opposite end thereof, a plug for normally closing the said open end of the axle, a pin passing through the plug, the walls of the axle and the bearing in the other of the said arms to fix the axle in position both revolubly and longitudinally and to simultaneously secure the plug in position therein, a trolley wheel mounted on the said axle, there being ports making communication between the said lubricant chamber and the bearing surfaces between the said axle and the hub of the trolley wheel, and means for admitting a lubricant to the said lubricant chamber.

Signed by me this 9th day of December, 1927.

TREVOR H. TISDALL.